United States Patent Office 3,265,578
Patented August 9, 1966

---

3,265,578
STABILIZED SOLID COMPOSITION SOLUBLE IN WATER TO FORM HYPOIODOUS ACID
Frank J. Zsoldos, Jr., 25—63 33rd St., Astoria, N.Y.
No Drawing. Filed Dec. 6, 1963, Ser. No. 328,498
13 Claims. (Cl. 167—70)

This invention is concerned with a novel composition comprising iodine contained in an N-iodopolychlor compound that is the product of a reaction in the solid phase in the presence of moisture of an N-chloro compound with an iodine-containing substance, the composition being sufficiently soluble in water to form highly germicidal HOI (hypoiodous acid) solutions. This application is a continuation-in-part of my application Ser. No. 234,217 filed October 30, 1962, now abandoned.

I have discovered that certain organic N-chloro compounds such as the chlorinated hydantoins and N-chlorosuccinimide are capable of reacting in the solid phase with alkali metal iodides and elemental iodine to form compounds of the RN-iodochlor type (wherein R designates the organic portion of the molecule) whose desirable properties may be employed with great advantage and economy. For example, crystalline iodine or potassium iodide triturated in specified proportions with N-chlorosuccinimide and allowed to age for forty-eight hours (after which time the mixture will have assumed an orange hue) will not only be soluble in water to produce potently germicidal solutions of HOI (hypoiodous acid) but also will be stable to ordinary atmospheric conditions without loss of substantial halogen titre.

The nature of the simpler primary action that takes place may be illustrated by the following partial reaction mechanism: $Cl^+ + I^- \rightarrow I^\circ + Cl^-$ wherein elemental iodine is produced from the iodide. The iodine will continue to be acted upon by the N-chloro material to produce the RN-iodochlor compound, as indicated below in the case of a heterocyclic compound:

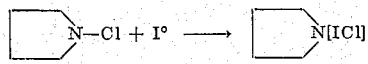

Continued reaction will evolve the complex polychlors wherein an iodine atom is attached to a plurality of chlorine atoms by reaction which can be posed as follows:

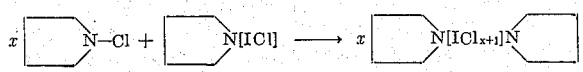

Both of the aforesaid forms of iodochlor compounds are characterized by their yellow-orange colors, by their pungent odors, by their resistance to heat, by their solubility in carbon tetrachloride to yield pale straw-colored solutions and by their ability to yield water solutions of colorless hypoiodous acid which can be detected with Feigl's benzidine acetate reagent. The iodochlor reaction upon solution in water can be expressed by the summarizing equation:

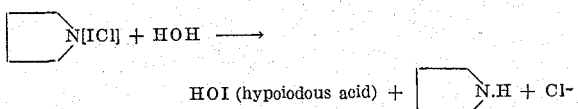

Mild acidity or alkalinity imposed upon the reaction will not affect the HOI yield, it will only alter the residual by-products.

The aforementioned straw-colored solution of the polychlor in carbon tetrachloride can be caused to rapidly decompose through addition of a few milliliters of a strong aqueous solution of sodium nitrite. The decomposition will be to chloride and free elemental iodine which will be redissolved by the carbon tetrachloride to form the well known deep violet color of free iodine in that solvent. The equation of the reaction is as follows:

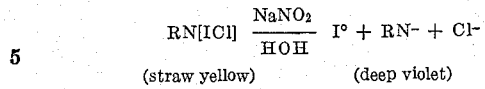

As vital as is the remarkable germicidal activity of the solutions prepared from these iodochlor compounds, the resistance of these substances toward heat and atmospheric conditions constitutes a major improvement in the art of stabilizing germicidal iodine compositions without concomitant impairment of germicidal effectiveness. It thus becomes a prime purpose of the present invention to utilize the iodochlor reaction to maintain germicidal iodine concentrations within solid mixtures that are forced to withstand less than ideal conditions of storage and use such as is, for example, offered by tropical climates, namely, heat and humidity.

According to the present invention, special combinations of metallic iodides and of elemental iodine with certain N-chloro compounds are provided that alleviate the difficulty of mixture decomposition by directing such decomposition along non-destructive pathways so as to result in a change which may be visually observed without, however, substantially impairing the original titre of total available halogen.

Previous attempts at achieving mixtures of such N-chloro compounds and iodides have all been most cognizant of the decomposition factor, for it is obvious that such a mixture of an oxidant with a reductant would be grossly unstable unless extraordinary measures were taken as, for example, those described in Patent No. 2,380,970. According to this patent stabilization of mixtures such as those disclosed in Patent No. 2,250,504 is accomplished by a thorough dehydration of all materials and the use of costly moisture-proof packaging. A modification of the method is disclosed in Patent No. 2,902,405 in which complete dehydration was replaced by partial dehydration. The need, however, for moisture-proof packaging could not be prevented.

Other investigators have sought to prevent reaction by resorting to an elaborate coating of pre-sized granules of metallic iodide with multiple layers of an insulating material as proposed, for example, in Patent No. 2,817,621. Methods for coating the N-chloro compound are disclosed in Patent No. 1,950,956. However, expedients such as these require an uneconomical use of specialized equipment, skills and materials in that the reactant materials must be custom produced as to particle size and uniformity and also processed. Moreover, efficacy must relay heavily upon the gentle handling techniques of packaging machinery and by the ultimate user himself, lest the particles be broken and the reaction thereof initiated. Furthermore, even at best the coating operation is rarely complete and the final mixture still requires a fair degree of expensive moisture-proof packaging.

When it is considered that the aforesaid preparations heretofore proposed are forced to compete with inexpensive inorganic chlorine donors, it can readily be seen that in spite of their many advantages their excessive cost places severe limits on their acceptability in competitive industrial sanitation. The problem becomes almost insurmountably acute in the treatment of swimming pool waters, with the result that there has been virtually no usage a all for such purposes of the aforesaid preparations.

It is an object of this invention to afford a hypoiodous acid producing composition suitable for treating swimming pool waters or industrial processes that is stable and likewise is economical to produce and use. This has been accomplished by renouncing the long-held but costly concept that the reaction in the solid phase between oxidant and reductant must be absolutely prevented. Instead, reaction between the oxidant and reductant is deliberately sought but is carefully guided and controlled along pre-selected lines.

It has been discovered, as previously outlined, that by employing certain N-chloro compounds the reaction between the N-chloro compound and iodide or elemental iodine can be caused to yield substances that are completely suitable for the purposes originally intended while at the same time the mixture does not undergo substantial loss of total available halogen titre.

The nature of the action that takes place may be illustrated in the case of an intimate mixture of 87% by weight of commercial grade dichlorodimethylhydantoin and 13% of potassium iodide. When this mixture is exposed to humidities of 55% or greater, a slow reaction occurs with liberation of elemental iodine. This liberated iodine will, however, remain dissolved within the crystal of potassium iodide to form a polyhalide of the type $KI \cdot I_2$. This reaction transforms the original all-white mixture into a white one containing black specks, but represents no loss of titrable halogen.

Continuation of the exposure of the mixture to high humidities causes a further reaction yielding products of the type RN[ICl] wherein R has the conventional significance of designating the balance of the N-chloro molecule. This reaction is accompanied by a transition of the recently formed black specks so as to assume a tan color, and again there is no substantial loss in total available halogen titre.

Still further exposure of the composition to humid atmosphere produces iodopolychlor-hydantoins wherein the tan specks gradually turn yellow and finally a brilliant orange, still with no substantial loss of titrable halogen.

In order to provide the novel compositions of the invention, an N-chloro compound should be selected which has stability against loss of available chlorine in any amount greater than about 2% after twenty-four hours' exposure to 100% relative humidity at room temperature. In addition, the N-chloro compound should be one which, by reason of an adequate degree of dissociation of its N-chloro radicals as well as a minimum solubility of the entire compound, yields a sufficient concentration of mobile chlorine ions to effect an iodochlor reaction. Even though the reaction between the N-chloro and iodine components of the present composition is to take place in the solid state, a certain mobility of the combinants must exist in order for any action to take place. Extensive insolubility would render such mobility of ions as is necessary impossible to achieve. A lack of dissociation into the ionic state would have the same hindering effect on the ionic mobility. Therefore, a degree of dissociation as well as solubility is vital for the purposes of interaction. The express release of ions as initiated by moisture can be indicated as:

$$RN-Cl \rightarrow RN^- + Cl^+$$

The extent or degree of dissociation is a percentage figure obtained measurably by electrical conductance methods; and dissociation constants (pK) are calculated from the experimentally determined percentage of dissociation and the known concentration of the solution, as indicated below:

$$\text{Percent degree of dissociation} = \frac{\text{conductivity of concentrated solution}}{\text{conductivity at infinite dilution}}$$

therefore:

$$\text{dissociation constant } (K) = \frac{\text{concentration of ions as calculated}}{\text{concentration of salt}}$$

A certain amount of dissociation and water solubility are necessary to provide the ions $RN^- + Cl^+$; and when these ions are provided in adequate amount in relation to the iodine they can in turn regroup with the iodine-containing portion of the composition to form the desired iodopolychlors.

(1) $RN-Cl \rightarrow RN^- + Cl^+$
(2) $Cl^+ + KI \rightarrow I° + KCl$
(3) $RN^- + Cl^+ + I° \rightarrow RN[ICl]$
(4) $RN[ICl] + [RNCl]_x \rightarrow [RN]_{x+1} + ICl_{x+1}$ In the foregoing reactions, as indicated, $x$ is 1 or other small whole number which, because of steric hindrance, probably is not greater than 5, although the exact upper limit is not definitely known. In any case, the upper limit is not critical in the practice of this invention.

It is apparent from the above that an insufficient supply of $Cl^+$ ions would render Equations 3 and 4 inoperative and that consequently the sequence must falter at the I°, or elemental iodine stage. By having a sufficient excess of the N-chloro compound present in the dissociated state in the presence of moisture so that substantially all of the iodine is held in the iodochlor form and the undesired presence of iodine in its elemental form is held down so as to amount to only about 1% to 2% by weight of the total iodine content of the composition. It is desirable that the elemental iodine be not more than about 5% by weight of the total iodine content. Preferably the total iodine content is at least about 2% by weight.

More specifically, the N-chloro compound must be one whose solubility in water is not less than 0.1% at room temperature and whose dissociation constant is not less than about $10^{-11}$. Examples of N-chloro compounds whose solubility and dissociation meet these requirements are N-chloro-succinimide, 1,3-dichloro-5,5-dimethylhydantoin, 1,3-dichloro-5,5-diethylhydantoin, 1 monochlor-5,5-dimethylhydantoin, dichloroisocyanuric acid and trichloroisocyanuric acid. Each of the foregoing is operative according to this invention. Other N-chloro compounds which are operative and satisfy the aforesaid requirements are monochlorohydantoin and monochloroisocyanuric acid. The N-chloro compounds which, because of their properties, are preferred for use in the practice of this invention are N-chloro compounds wherein the organic radical is heterocyclic. All of the above exemplified N-chloro compounds possess the further requirement stated hereinabove of possessing stability against loss of available chlorine greater than 2% after twenty-four hours' exposure to 100% humidity at room temperature. When reference is made herein to room temperature, the reference is to a temperature of about 70° F.

Another most essential and most significant feature of this invention is that the available chlorine content of the N-chloro compound be in considerable stoichiometric excess over the iodine content of the iodine-containing substance. Thus there must be present an absolute minimum of a 4:1 molar ratio of available chlorine to the iodine content of the iodine-containing substance when said iodine content is expressed as metallic iodide in order that the organic-iodine-polychlorides may be formed. Failure to maintain this minimum ratio will yield, instead of the acceptable products previously described, a rather intractable, dense, mud-like insoluble mass of a sublimaceous nature which in the main consists of finely divided particles of elemental iodine. This cannot be otherwise because essentially all of the reactants would be consumed to form elemental iodine. There would simply not be enough N-chloro radicals available to accomplish the conversion of the elemental iodine to the desired iodochlor state and the reaction would falter at the I° or elemental iodine stage, as has been indicated herein above in connection with partial Reactions 1, 2, 3 and 4.

Inorganic chlorine sources such as calcium hypochlorite or lithium hypochlorite are not to be desired for the purposes of this invention in that they react rather violently to form unstable and obnoxious inorganic iodine chlorides.

The choice of iodine-containing substance is dictated by economics. Generally speaking, potassium iodide is the most readily available, although alkali metal iodide may be used, e.g. sodium iodide and lithium iodide. They should be obtained preferably in the regular commercially available granular form in order that the reaction series of the mixture previously described may be taken full advantage of. It is not necessary to remove the fines from these materials. However, the powdered form tends somewhat to accelerate the reaction sequences and, to a corresponding extent, shorten the aging life of the composition.

It also has been discovered as previously described that elemental iodine can yield useful mixtures according to this invention. However, in this instance the elemental iodine should be powdered so that it may be immediately converted to the organic iodine-polychloride form lest the elemental iodine be lost through sublimation. Because the use of elemental iodine accelerates the reaction series, the employment of elemental iodine, although useful, is not the preferred method of practicing this invention. When elemental iodine is employed instead of a metallic iodide, the 1 mol of available chlorine that reacts with a metallic iodide to liberate 1 mol of elemental iodine that is retained in the solid polyhalide hereinabove described is not needed since the iodine already is present as elemental iodine, with the result that in the case of powdered elemental iodine the required stoichiometric ratio of available chlorine comprised in the N-chloro compound to iodine in the form of powdered elemental iodine is 2:1 instead of 3:1. It is for this reason that in the claims the stoichiometric ratio of 3:1 is given for the ratio of the available chlorine content of the N-chloro compound to the iodine content of the iodine-containing substance expressed as metallic iodide with the significance, in accordance with the known technology, that this calls for a ratio of 2:1 as to any iodine that, as initially admixed, is in the form of finely divided elemental iodine.

The employement with the N-chloro compound of a combination of granular alkali metal iodides and powdered elemental iodine offers still another alternative method of practicing this invention.

In preferred practice of this invention a coloring agent is used such as a pigment in order to mask the color changes of the mixture during aging. In most instances this can be accomplished by the use of powdered inert mineral pigments as, for example, rouge, azurite, copper hydroxide, lapis lazuli and carbon. For swimming pool usage it is preferable in the practice of this invention to employ an insoluble copper mineral or carbon in its black opaque form.

While not essential to the practice of this invention, it is preferable to incorporate, so as to be uniformly distributed in the initial dry mixture, a hydrophobic material which preferably is talc and desirably constitutes from about 0.1% to about 20% by weight of the total composition. The talc may be incorporated by simple blending; and, by imparting to the mixture substantially enhanced hydrophobic properties than otherwise is the case, here is concomitant retardation of the reactions hereinabove described which is desirable in those instances wherein the composition of this invention is exposed to greatly excessive humidity conditions, so that still greater stability is afforded. Thus a mixture containing 86% of dichloro-dimethylhydantoin, 12% of potassium iodide, and 2% of talc exhibited no significant loss of halogen titre after forty-eight hours of exposure to 98% humidity at room temperature. The water-repellent or hydrophobic material that is used should be one which is in the form of a pulverulent solid that is substantially non-reactive with the other components of the mixture and is substantially water-insoluble at room temperature. Examples other than talc are magnesium stearate, powdered glass, silicon dioxide, titanium dioxide and stearic acid.

A second important means of alleviating the stresses arising through exposure to gross excesses of humidities is to incorporate into the mixture a substance capable of adsorbing and retaining the gross excess of moisture such as microfine silica or calcium silicate, diatomaceous earth, activated alumina and activated carbon. Via the mechanics of adsorption these substances physically prevent excess moisture from ever entering the reaction field. All of the foregoing may be used singly or in combination in the manner and amounts above mentioned, namely, about .01% to about 20%.

In effecting the dry mixing of the N-chloro compound with the iodine-containing substance, it obviously would be inconsistent with the practice of the invention for there to be present in the mixture some other substance that is reactive with the available chlorine of the N-chloro compound. Thus the dry mixture should be essentially free of acidic substances or residues such as sulfuric, citric or tartaric acid or sodium acid phosphate, since such acidic substances adversely affect the stability of the organic iodopolychlor that is the reaction product of the admixture. The effect of the excessive acidity is to destroy the organic iodochlor through the formation of volatile inorganic iodine chlorides as indicated by the following partial equation:

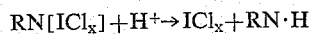

$$RN[ICl_x] + H^+ \rightarrow ICl_x + RN \cdot H$$

Excessive alkalinity such as is afforded by sodium carbonate, potassium carbonate, and borax is also to be avoided. These strongly alkaline salts cause an increase in the dissociation of the N-chloro radicals, thus rendering them too active for the purposes here intended. Such an inclusion of alkalinity will convert most of the iodine into the inert iodate form. All of the foregoing does not, however, preclude the use of the milder acidic agents such as boric acid, nor the use of the milder basic agents such as sodium bircarbonate or other buffer for maintaining the pH between about 5.5 and about 8.5.

It likewise is obvious that there should not be present a reducing agent for the N-chloro compound other than the iodine-containing substance. More generally, the iodine-containing substance should be essentially the sole reactant with the selected N-chloro compound.

In a similar vein, the organic radical of the N-chloro compound, as has been designated by the letter R in most of the previous equations, must offer no readily reactive sites for the reduction of the iodochlors to simple halide forms. Generally speaking, those compounds containing phenyl groups incompletely substituted are not good reactants for the purposes here described, as for example chloramine-T. A reaction of another sort to be avoided is that which results in a polymerization of the organic residue resulting in strong chromatic changes of the compound, as for example with melamine compositions. More generally, it is apparent that the organic radical of the N-chloro compound that becomes converted to the RN-iodochlor compound in solid phase be substantially inert as regards the tendency to react either with itself or with iodine contained in the iodochlor compound.

The following examples are given, for illustrative purposes only, of compositions that will retain their total halogen titre for a useful length of time even when exposed, sans protective packaging, to humidities of 55% and over:

*Example A*

| | Percent |
|---|---|
| Potassium iodide, granular | 15 |
| 1,3-dichloro-5,5-dimethylhydantoin | 82 |
| Talc | 1 |
| Azurite | 2 |

In this example the copper mineral (azurite) not only serves as a masking pigment, as previously described, but also serves as an algaecide when the composition is used for outdoor swimming pool water treatment according to preferred practice of this invention.

*Example B*

| | Percent |
|---|---|
| Sodium iodide, powdered | 10 |
| 1-monochloro-5,5-dimethylhydantoin | 87 |
| Silica, powdered | 1 |
| Activated carbon | 2 |

Example B incorporates the activated carbon as a grey pigment, which, as in the case of the talc in Example A, serves as a buffer against excessively severe humidity conditions.

*Example C*

| | Percent |
|---|---|
| Elemental iodine, powdered | 15 |
| Succinchlorimide | 83 |
| Magnesium trisilicate | 2 |

Compositions such as those hereinabove exemplified may be stored indefinitely in conventional closed containers. When the containers have been opened, then, even under conditions such that the container is opened every day for removal of some of its contents with exposure of the balance to an atmosphere of relatively high humidity, the composition will remain stable for as long as about three months with only a very small loss of total halogen titre such as about 5%. This provides ample stability for commercial utilization under the conditions usually encountered in treating swimming pool waters or industrial sanitation. When added to swimming pool waters or other bodies of water, effective germicidal activity imparted by the composition results from the production of hypoiodous acid whose effectiveness and stability as thus produced are disclosed in my aforesaid application Ser. No. 199,483.

In making the formulations of the foregoing examples, the iodine-containing substance is first blended with the water-repellent and/or water-absorbent powder in a gentle tumbler mixer and then the N-chloro compound is added. While it is one of the prime advantages of this invention that no special packaging or application of protective coatings is required, nevertheless such expedients are not inconsistent with the practice of my invention.

What is claimed is:

1. A solid composition which is stable against substantial loss of halogen titre under ordinary atmospheric conditions of temperature and humidity and which is soluble in water to form a solution containing hypoiodous acid, said composition containing at least about 2% by weight of iodine contained in complex N-iodopolychlors wherein an iodine atom is attached to a plurality of chlorine atoms and that are the product of reaction in the solid phase in the presence of moisture of an N-chloro compound with an iodine-containing substance contained in a mixture of said compound and said substance in which the molar ratio of available chlorine contained in said N-chloro compound to iodine expressed as iodide is at least 3:1, said iodine-containing substance being selected from the group consisting of alkali metal iodides and elemental iodine, said N-chloro compound having a dissociation constant of at least $10^{-11}$, having a water solubility at room temperature of at least 0.1%, having a stability in solid phase against loss of chlorine in an amount in excess of 2% thereof upon 24 hours' exposure to 100% humidity at room temperature, and the organic radical of the said N-chloro compound contained in the solid phase in said composition being substantially inert.

2. The solid composition of claim 1 wherein less than 5% of the total iodine content is in the form of elemental iodine.

3. A solid composition which is stable against substantial loss of halogen titre under ordinary atmospheric conditions of temperature and humidity and which is soluble in water to form a solution containing hypoiodous acid, said composition containing at least about 2% by weight of iodine contained in complex N-iodopolychlors wherein an iodine atom is attached to a plurality of chlorine atoms and that are the product of reaction in the solid phase in the presence of moisture of an organic heterocyclic N-chloro compound with an iodine-containing substance contained in a mixture of said compound and said substance in which the molar ratio of available chlorine contained in said N-chloro compound to iodine expressed as iodide is at least 3 to 1, said iodine-containing substance being selected from the group consisting of alkali metal iodides and elemental iodine, and said N-chloro compound having a dissociation constant of at least $10^{-11}$, having a water solubility at room temperature of at least 0.1% and having a stability in solid phase against loss of chlorine in an amount in excess of 2% thereof upon 24 hours' exposure to 100% humidity at room temperature.

4. A solid compound which upon its addition to water yields hypoiodous acid, said compound being an N-iodopolychlor compound wherein an iodine atom is attached to a plurality of chlorine atoms and that is the product of reaction in solid phase of an N-chloro compound selected from the group of heterocyclic compounds consisting of N-chlorosuccinimide, 1,3-dichloro-5,5-diethylhydantoin, 1,3-dichloro-5,5-dimethylhydantoin, monochlor hydantoin, 1-monochloro-5,5-dimethylhydantoin, trichloroisocyanuric acid, dichloroisocyanuric acid and monochloroisocyanuric acid with an iodine-containing substance selected from the group consisting of elemental iodine and an alkali metal iodide wherein the molar ratio of the available chlorine content of said N-chloro compound to the iodine content expressed as iodide of said iodine-containing substance is at least 3 to 1.

5. A composition as stated in claim 1 which includes in intimately dispersed relation in the mixture a pulverulent opaque pigment inert toward the active ingredients of said product for the purpose of masking changes of color that occur in the solid composition during aging in the solid phase.

6. A composition as stated in claim 5 wherein said pigment is selected from the group consisting of water-insoluble copper minerals and carbon in the black opaque form.

7. A composition as stated in claim 1 which includes in intimately dispersed relation in the mixture a pulverulent, water-insoluble hydrophobic solid inert toward the active ingredients of said mixture for the purposes of imparting to said mixture said hydrophobic properties.

8. A composition as stated in claim 7 wherein said hydrophobic solid is selected from the group consisting of talc, magnesium stearate, stearic acid, silicon dioxide and titanium dioxide.

9. A composition as stated in claim 1 which includes in intimately dispersed relation in the mixture a pulverulent adsorbent solid selected from the group consisting of activated silica, activated alumina, calcium silicate, diatomaceous earth and activated carbon for the purposes of binding excess moisture that may accumulate within said mixture.

10. A composition as stated in claim 1 which includes in intimately dispersed relation in the mixture a buffer for maintaining the pH between about 5.5 and about 8.5.

11. The solid compound of claim 4 wherein said iodine-containing substance is potassium iodide.

12. The solid compound of claim 4 wherein said iodine-containing substance is sodium iodide.

13. The solid compound of claim 4 wherein said iodine-containing substance is lithium iodide.

(References on following page)

References Cited by the Examiner

UNITED STATES PATENTS

| | | | |
|---|---|---|---|
| 2,250,504 | 7/1941 | Salerni | 167—70 |
| 2,817,621 | 12/1957 | Marks | 167—70 |
| 2,902,405 | 9/1959 | Carroll et al. | 167—70 |
| 2,904,470 | 9/1959 | Berliner et at. | 167—70 |
| 3,147,259 | 9/1964 | Patersen | 260—309.5 |

OTHER REFERENCES

The Merck Index, 6th ed., Merck and Co., Inc., New Jersey, 1952, pp. 201, 291.

JULIAN S. LEVITT, *Primary Examiner.*

S. J. FRIEDMAN, *Assistant Examiner.*

UNITED STATES PATENT OFFICE
CERTIFICATE OF CORRECTION

Patent No. 3,265,578                             August 9, 1966

Frank J. Zsoldos, Jr.

It is hereby certified that error appears in the above numbered patent requiring correction and that the said Letters Patent should read as corrected below.

Column 2, line 33, for "this patent" read -- this patent, --; line 51, for "relay" read -- rely --; line 65, for "a" read -- at --; column 4, line 58, for "4:1" read -- 3:1 --; column 5, line 65, for "here" read -- there --.

Signed and sealed this 22nd day of August 1967.

(SEAL)
Attest:

ERNEST W. SWIDER
Attesting Officer

EDWARD J. BRENNER
Commissioner of Patents